United States Patent [19]

Fujiki

[11] Patent Number: 5,236,997
[45] Date of Patent: Aug. 17, 1993

[54] CURABLE FLUOROSILICONE RUBBER COMPOSITION

[75] Inventor: Hironao Fujiki, Takasaki, Japan

[73] Assignee: Shin-Etsu Chemical Co., Ltd., Tokyo, Japan

[21] Appl. No.: 836,589

[22] Filed: Feb. 18, 1992

[30] Foreign Application Priority Data

Feb. 18, 1991 [JP] Japan .................................. 3-045844

[51] Int. Cl.$^5$ ...................... C08F 283/12; C08G 77/16
[52] U.S. Cl. ..................................... 524/731; 524/863; 524/864; 528/42; 528/34; 528/17; 528/18; 525/477
[58] Field of Search ........................ 524/863, 864, 731; 528/42, 34, 17, 18; 525/477

[56] References Cited

U.S. PATENT DOCUMENTS

| | | | |
|---|---|---|---|
| 3,742,004 | 6/1973 | Nitzsche et al. | 260/448.2 N |
| 4,166,053 | 8/1979 | Bossert et al. | 260/18 S |
| 4,988,758 | 1/1991 | Fukuda et al. | 524/492 |
| 5,073,422 | 12/1991 | Konno et al. | 428/40 |

*Primary Examiner*—John C. Bleutge
*Assistant Examiner*—Margaret W. Glass
*Attorney, Agent, or Firm*—Millen, White, Zelano & Branigan

[57] ABSTRACT

A room temperature-curable fluorosilicone rubber composition is disclosed, which is capable of giving a cured silicone rubber having excellent resistance against organic solvents and petroleums with high curability despite the high fluorine content which may cause steric hindfrance against the curing reaction due to the bulkiness of the fluorine-containing substituent groups. Different from conventional fluorine-containing diorganopolysiloxanes, in which the fluorine-containing substituent groups are bonded to the silicon atoms at random positions throughout the molecule, several silicon atoms from each of the molecular chain ends of the diorganopolysiloxane as the principal ingredient of the inventive composition are free from fluorine-containing substituent groups so that the crosslinking reaction with the silanolic hydroxy groups bonded to the terminal silicon atoms is not disturbed by the fluorine-containing groups in the vicinity of the terminal silanol groups.

5 Claims, No Drawings

CURABLE FLUOROSILICONE RUBBER COMPOSITION

BACKGROUND OF THE INVENTION

The present invention relates to a novel curable rubber composition based on a fluorosilicone polymer or, more particularly, to a fluorosilicone rubber composition which can be rapidly cured even at room temperature into an elastomeric form having excellent resistance against oils, gasoline and organic solvents and is useful as a material of sealings or as an adhesive.

Although silicone rubbers in general have excellent properties relative to heat resistance at high temperatures, stability at low temperatures, weatherability and electric properties, as is well known, they are not always quite satisfactory in respect of the resistance against organic solvents and petroleum-based hydrocarbon liquids such as gasoline and kerosene to cause swelling in these liquids. This defect sometimes greatly limits the application fields of silicone rubbers even when the other serious problem of corrosiveness against metallic surfaces unavoidable in the room temperature-curable silicone rubber compositions of the most conventional type, which are cured by the mechanism of deacetylation condensation reaction to produce acetic acid as a by-product, is not an important limiting factor.

Various proposals and attempts have been made with an object to provide a silicone rubber highly resistant against organic solvents. For example, U.S. Pat. Nos. 2,979,518 and 3,179,619 teach replacement of a part of the hydrocarbon groups, e.g., methyl and phenyl groups, bonded to the silicon atoms in the organopolysiloxane molecules with perfluoroalkyl-containing groups such as 3,3,3-trifluoropropyl groups. One of the problems in these silicone rubber compositions based on a fluorine-substituted organopolysiloxane is that, presumably due to the bulkiness of the fluorine-substituted alkyl or alkyl ether groups to effect steric hindrance, adverse influences are caused on the curing behavior of the rubber composition eventually to inhibit the curing reaction of an organopolysiloxane having the fluorine-substituted groups in an excessively high content.

SUMMARY OF THE INVENTION

The present invention accordingly has an object to provide a novel fluorosilicone rubber composition capable of being rapidly cured even at room temperature without the problem of adverse influences on the curing reaction even when the content of fluorine in the organopolysiloxane is high enough to exhibit excellent resistance against organic solvents and petroleums of the cured silicone rubber.

Thus, the curable fluorosilicone rubber composition of the invention is a uniform blend which comprises:
(a) 100 parts by weight of a fluorine-substituted organopolysiloxane represented by the general formula

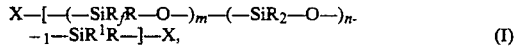

in which R is a monovalent hydrocarbon group having 1 to 8 carbon atoms, $R_f$ is a fluorine-substituted alkyl group or a fluorine-substituted alkyl group having one or more of etheric oxygen atoms —O— or amide linkages —CONH— between carbon atoms, $R^1$ is R or $R_f$, X is a group represented by the general formula

Me being a methyl group, Q being a divalent group of the formula —O—Si(CH$_3$)$_2$—O— or a divalent hydrocarbon group having 2 to 10 carbon atoms, $R^2$ being an atom or group selected from the class consisting of a hydrogen atom, hydroxy group, methyl group and vinyl group and the subscript a being an integer of 1 to 20, and the subscripts m and n are each a positive integer with the proviso that m+n is in the range from 10 to 3000;
(b) from 0.5 to 20 parts by weight of an organosilicon compound having, in a molecule, at least three hydrolyzable groups bonded to the silicon atom or atoms;
(c) up to 500 parts by weight of an inorganic filler; and
(d) a curing catalyst in an amount sufficient to cure the composition into an elastomeric form.

In the above given general formula (II), the value of the subscript a is preferably at least 2 so that the undesirable effect of steric hindrance against curing can be more fully prevented.

DETAILED DESCRIPTION OF THE PREFERRED EMBODIMENTS

Among the above described components (a) to (d) comprised in the inventive silicone rubber composition, the principal and most characteristic ingredient is the component (a) which is a fluorine-substituted organopolysiloxane having fluorine-containing groups denoted by $R_f$. The component (a) is basically a diorganopolysiloxane consisting of a linear sequence of diorganosiloxane units including the units having the fluorine-containing groups denoted by $R_f$ bonded to the silicon atoms, i.e. the units expressed by the formula (—SiR$_f$R—O—) in the general formula (I), in which the units within the square brackets [ ] including m in number of the fluorine-containing units (—SiR$_f$R—O—) and n−1 in number of the non-fluorine units (—SiR$_2$—O—) are bonded together at a random sequence.

Different from conventional fluorine-substituted diorganopolysiloxanes consisting of these two types of diorganosiloxane units, however, each of the molecular chain ends of the component (a) is terminated with the group denoted by X which in turn is an organosiloxane group having at least two silicon atoms when Q is an oxygen atom or an organosilyl-substituted hydrocarbyl group when Q is a divalent hydrocarbon group each free from fluorine atoms. This limitation means that at least two silicon atoms from each molecular chain end of the component (a) are free from the fluorine-substituted group $R_f$ bonded thereto.

In the general formula (I) representing the component (a), the symbol R denotes a monovalent hydrocarbon group having 1 to 8 carbon atoms, preferably, free from aliphatic unsaturation exemplified by alkyl groups such as methyl, ethyl, propyl and butyl groups, cycloalkyl groups such as cyclohexyl group, aryl groups such as phenyl and tolyl groups and aralkyl groups such as benzyl and 2-phenylethyl groups, of which methyl and phenyl groups are preferred. More preferably, all or most of the groups denoted by R are methyl groups.

The symbol $R_f$ in the general formula (I) is a fluorine-substituted alkyl group exemplified by the groups expressed by the formulas: CF$_3$CH$_2$CH$_2$—; C$_4$F$_9$CH$_2$CH$_2$—; C$_8$F$_{17}$CH$_2$CH$_2$—; and the like. The fluoroalkyl group may optionally have one or more of oxygen atoms —O— or amide groups —CO—NH— as a linking unit interposed between carbon atoms. Examples of such an oxygen- or amide group-containing fluoroalkyl group include those expressed by the following formulas: $C_4F_9CH_2CH_2-O-CH_2CH_2CH_2-$; $C_6F_{13}CH_2CH_2-O-CH_2CH_2CH_2-$; $C_8F_{17}CH_2CH_2-O-CH_2CH_2CH_2-$; $C_3F_7-O-[-CF(CF_3)-CF_2-O-]_p-CF(CF_3)-CH_2-O-CH_2CH_2CH_2-$; $C_3F_7-O-[-CF(CF_3)-CF_2-O-]_p-CF(CF_3)-CH_2-O-CH_2-$; $C_3F_7-O-[-CF(CF_3)-CF_2-O-]_p-CF(CF_3)-CH_2-CO-NH-CH_2CH_2CH_2-$; $C_4F_9-O-[-(CF_2)_4-O]_p-(-CF_2-)_3-CH_2-O-CH_2CH_2CH_2-$; $C_4F_9-O-[-(CF_2)_4-O]_p-(-CF_2-)_3-CH_2CH_2-$; $C_4F_9-O-[-(CF_2)_4-O]_p-(-CF_2-)_3-CO-NH-CH_2CH_2CH_2-$; $C_2F_5-O-[-(CF_2)_2-O-]_p-CF_2CH_2-O-CH_2CH_2CH_2-$; $C_2F_5-O-[-(CF_2)_2-O-]_p-CF_2CH_2CH_2-$; $C_2F_5-O-[-(CF_2)_2-O-]_p-CF_2CO-NH-CH_2CH_2CH_2-$; and the like, in which p is 0, 1, 2 or 3. The group denoted by $R^1$ in the general formula (I) can be either R or $R_f$.

The group denoted by X at each molecular chain end of the organopolysiloxane represented by the general formula (I) is represented by the general formula (II), in which Me is a methyl group and Q is a divalent group of the formula $-O-Si(CH_3)_2-O-$ or a divalent hydrocarbon group having 2 to 10 carbon atoms or, preferably, an alkylene group such as $-CH_2CH_2-$, $-CHCH_3-CH_2-$, $-(-CH_2-)_3-$, $-(-CH_2-)_6-$ and the like or an arylene group such as phenylene and tolylene groups. The group denoted by $R^2$ is selected from the class consisting of hydrogen atom, hydroxy group, methyl group and vinyl group. The subscript a in the general formula (II) is a positive integer of 1 to 20 or, preferably, 2 to 20 in order to more fully prevent the effect of steric hindrance.

As is understood from the above given description, each of the silicon atoms at the free end of the group X represented by the general formula (II) has at least one or 1 to 3 hydroxy groups bonded thereto to serve for crosslinking by the condensation reaction with the hydrolyzable groups in the component (b). When the subscript a in the general formula (II) is 2 or larger, at least two silicon atoms from the molecular chain end of the organopolysiloxane are free from the fluorine-containing substituent groups $R_f$ so that the otherwise adverse influences of the fluorine-containing groups on the crosslinking reaction with the terminal hydroxy groups can be efficiently avoided.

The subscripts m and n in the general formula (I) are each a positive integer with the proviso that m+n is in the range from 10 to 3000. When the value of m+n is too small, the composition cannot exhibit rubbery elasticity even after full curing only to give a brittle mass. When the value of m+n is too large, on the other hand, the organopolysiloxane as the component (a) would have an unduly high viscosity to cause difficulties in the compounding work with the other ingredients and in the molding work of the composition. The value of m or the ratio of m:n is determinant of the content of fluorine in the organopolysiloxane which should be as high as possible in order that the cured silicone rubber of the inventive composition may exhibit excellent high-temperature heat resistance, low-temperature stability, weatherability and resistance against organic solvents and petroleums. It is desirable that the content of fluorine in the organopolysiloxane as the component (a) is at least 24% by weight.

Examples of the fluorine-containing organopolysiloxane as the component (a) include those expressed by the following formulas, in which Me is a methyl group, $R_f^1$ and $R_f^2$ each denote 3,3,3-trifluoropropyl group $CF_3CH_2CH_2-$ and 2-(perfluorobutyl)ethyl group $C_4F_9CH_2CH_2-$, respectively, and a, m and n as the subscripts each have the same meaning as defined above:

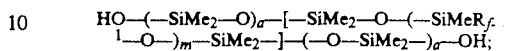

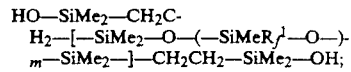

and

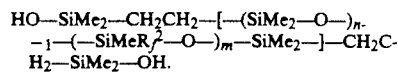

The fluorine-containing organopolysiloxane suitable as the component (a) can be prepared in the following manner, which, however, is described only for the purpose to give an example.

For example, a hydroxy-terminated fluorine-containing diorganopolysiloxane known in the art such as those expressed by the formula $$HO-(-SiMeR_f-O-)_m-H, \quad (1)$$

in which $R_f$ and Me each have the same meaning as defined above and the subscript m is a positive integer of 10 to 3000, is subjected to a dehydrochlorination condensation reaction with a dimethylpolysiloxane terminated at each molecular chain end with a chloro dimethyl silyl group expressed by the formula

in which the subscript a has the same meaning as defined above, so as to form a fluorine-containing diorganopolysiloxane terminated at each molecular chain end with a chloro dimethyl silyl group and several silicon atoms from each of the molecular chain ends are free from the fluorine-containing substituent groups as expressed by the formula

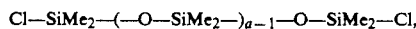

followed by the hydrolysis of the terminal chlorine atoms to be converted each into a silanolic hydroxy group giving a hydroxy-terminated diorganopolysiloxane of the formula

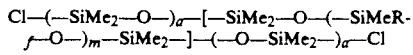

Alternatively, the fluorine-containing diorganopolysiloxane expressed by the above given formula (1) is admixed with dimethyl bis(dimethylamino) silane so as to convert the terminal hydroxy groups into dimethyl dimethylamino siloxy groups followed by the deamination condensation reaction thereof with a hydroxy-terminated dimethyl polysiloxane.

Further alternatively, a vinyl dimethyl silyl-terminated fluorine-containing diorganopolysiloxane of the formula

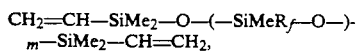

in which each symbol has the same meaning as defined above, is admixed with a methyl hydrogen polysiloxane of the formula

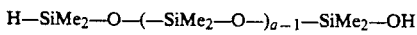

to effect the hydrosilation reaction in the presence of a catalytic amount of a platinum compound.

Still further alternatively, the vinyl dimethyl silyl-terminated fluorine-containing diorganopolysiloxane shown above is subjected to a hydrosilation reaction with dimethyl chlorosilane of the formula $(CH_3)_2HSiCl$ to form a fluorine-containing diorganopolysiloxane terminated at each molecular chain end with a 2-(dimethyl chloro silyl)ethyl group followed by the hydrolysis of the terminal chlorine atoms to be converted into silanolic hydroxy groups.

The component (b) in the inventive silicone rubber composition is an organosilicon compound, i.e. organosilane or organopolysiloxane, having at least three hydrolyzable groups bonded to the silicon atom or silicon atoms in a molecule which serves as a crosslinking agent by the condensation reaction with the terminal hydroxy groups in the component (a). The above mentioned hydrolyzable group is exemplified by alkoxy or alkoxy-substituted alkoxy groups such as methoxy, ethoxy, propoxy, butoxy, methoxyethoxy and ethoxyethoxy groups, acyloxy groups such as acetoxy, propionyloxy, butyryloxy and benzoyloxy groups, alkenyloxy groups such as isopropenyloxy, isobutenyloxy and 1-ethyl-2-methyl vinyloxy groups, iminoxy groups such as dimethyl ketoxime, methyl ethyl ketoxime, diethyl ketoxime, cyclopentanoxime and cyclohexanoxime groups, substituted amino groups such as methylamino, ethylamino, propylamino, butylamino, dimethylamino, diethylamino and cyclohexylamino groups, amido groups such as N-methyl acetamido, N-ethyl acetamido and N-methyl benzamido groups, substituted aminoxy groups such as dimethyl aminoxy and diethyl aminoxy groups, alkoxy-substituted alkenyloxy groups, and so on.

Among the above named various types of hydrolyzable groups, preferable are the alkoxy groups, alkenyloxy groups, iminoxime or ketoxime groups and alkoxy-substituted alkenyloxy groups when the inventive silicone rubber composition is intended to be used in electric or electronic parts because no corrosive by-products are produced by the condensation reaction with these hydrolyzable groups. Examples of the organosilicon compound suitable as the component (b) include methyl trimethoxy silane, vinyl trimethoxy silane, phenyl trimethoxy silane, vinyl triethoxy silane, tetraethoxy silane, tetra(n-propoxy) silane, methyl tris(-methyl ethyl ketoxime) silane, methyl tris(propenyloxy) silane, vinyl tris(propenyloxy) silane, phenyl tris(1-methoxy-2-methyl propenyloxy) silane and the like. These silane compounds can be used either singly or as a combination of two kinds or more according to need. Further, a partial (co)hydrolysis product of the silane or silanes can be used as the component (b).

The amount of the component (b) in the inventive silicone rubber composition is in the range from 0.5 to 20 parts by weight or, preferably, from 1 to 10 parts by weight per 100 parts by weight of the component (a). When the amount of the component (b), which serves as a crosslinking agent of the component (a), is too small, no full curing of the composition can be obtained as a matter of course so that the composition after curing would have only poor mechanical properties as well as poor resistance against organic solvents and petroleums. When the amount of the component (b) is too large, on the other hand, the composition after curing would be too rigid without rubbery elasticity due to the excessively high crosslinking density.

The inorganic filler as the component (c) is a reinforcing agent and contained in the inventive composition with an object to impart the composition after curing with good mechanical properties according to need. Various kinds of finely divided inorganic powders can be used for the purpose including reinforcing fillers such as fumed silica fillers and precipitated silica fillers without or with hydrophobilization treatment of the surface, and carbon black as well as semi-reinforcing fillers such as quartz powder, powder of fused quartz glass, diatomaceous earth, zeolite, calcium carbonate, titanium dioxide, iron oxide, alumina, aluminum hydroxide, aluminum nitride, magnesium sulfate and the like.

Though optional, it is advantageous in most cases that the inventive silicone rubber composition is compounded with this component (c). When added, the amount of the component (c) in the inventive composition should be at least 10 parts by weight per 100 parts by weight of the component (a) in order to obtain substantial improvements in the mechanical properties of the composition after curing. However, the amount of the component (c) should not exceed 500 parts by weight or, preferably, 400 parts by weight per 100 parts by weight of the component (a). When the amount of the component (c) is too large, difficulties are encountered in the compounding work of the respective components and the composition after curing would have poor mechanical properties.

The component (d) in the inventive silicone rubber composition is a curing catalyst which promotes the crosslinking reaction between the components (a) and (b) described above. Various kinds of known catalytic compounds having effectiveness for the condensation reaction between silanolic hydroxy groups and silicon-bonded hydrolyzable groups can be used as the component (d) without particular limitations. Examples of suitable catalytic compounds include metal salts of organic acids such as dibutyl tin dilaurate, dibutyl tin dibenzylmaleate, dibutyl tin dioctoate, iron stearate, lead octoate and the like, titanate esters such as tetra(isopropyl) titanate, tetrabutyl titanate and the like, chelate compounds of titanium such as acetylacetonato titanium and the like, and so on. No catalytic ingredient, however, is required when the component (b) is an acyloxy silane such as vinyl triacetoxy silane or a acetamido silane such as vinyl tris(N-methyl acetamido) silane and the like because the condensation product produced by the condensation reaction of the hydrolyzable groups in these compounds may exhibit a catalytic activity.

As is understood from the above, the amount of the component (d) suitable in the inventive silicone rubber composition widely differs depending on the kinds of the component (b) so that no definite range of the amount can be specified. As a rough measure, however, the amount of the component (d) is in the range from 0.001 to 10 parts by weight or, in most cases, from 0.1 to 2 parts by weight per 100 parts by weight of the component (a). When no full curing-promoting effect can be obtained by the addition of a small amount of the component (d), an unduly long time would be taken to fully cure the composition or, in particular, curing of the composition in the core portion of a thick body would be incomplete within a practical curing time. When the amount thereof is too large, on the other hand, the composition would have poor storage stability and the heat resistance of the composition after curing would be unduly decreased.

Besides the above described curing catalyst as the component (d), the crosslinking reaction between the components (a) and (b) is sometimes accelerated by the admixture of the composition with a small amount of a hydroxy-containing compound including water and alcohols such as methanol, ethanol, propanol, ethylene glycol, ethylene glycol monomethyl ether, ethylene glycol monoethyl ether, glycerin and the like.

It is further optional that the silicone rubber composition of the invention comprising the above described components (a) to (d) is admixed with various kinds of known additives conventionally used in silicone rubber compositions including coloring agents such as pigments and dyes, heat resistance improvers such as ceric oxide, ceric hydroxide, zinc carbonate, manganese carbonate, benzotriazole and the like, flame-retardants and organic solvents such as acetone, methyl ethyl ketone, ethyl acetate, fluorocarbon solvents and the like as well as various types of organopolysiloxanes having no or a single hydroxy group at a molecular chain end in a molecule but having compatibility with the component (a) to serve as an extender or to serve for decreasing the stress in the composition after curing.

In the following, the silicone rubber composition of the present invention is illustrated in more detail by way of examples as preceded by a description for the preparation of the fluorine-containing diorganopolysiloxanes as the component (a).

PREPARATION 1

A mixture prepared by mixing 1733 g of 1,3,5-tris(3,3,3-trifluoropropyl-1,3,5-trimethyl cyclotrisiloxane, 1 g of water, 350 g of acetonitrile and 0.5 g of benzyl trimethyl ammonium bis(o-phenylenedioxy)phenyl siliconate was agitated for 12 hours at 15° C. to effect the ring-opening polymerization of the cyclic siloxane oligomer followed by the addition of 5 g of acetic acid and stripping of volatile matters at 150° C. under a pressure of 5 Torr for 5 hours to give 1650 g of a fluorine-containing organopolysiloxane having a viscosity of 47,000 centistokes at 25° C. and expressed by the formula

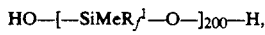

referred to as the F-siloxane A hereinbelow, in which $R_f^1$ is a 3,3,3-trifluoropropyl group.

A mixture of 1000 g of the F-siloxane A prepared above and 20 g of dimethyl bis(dimethylamino) silane was agitated for 1 hour at 40° C. followed by stripping of volatile matters at room temperature under a pressure of 5 Torr and addition of 500 g of dry methylene chloride taking care to avoid intrusion of moisture. Further, 100 g of a silanol-terminated dimethyl polysiloxane having a degree of polymerization of 10 were added to the mixture and the mixture was vigorously agitated for 1 hour at room temperature followed by aging at 40° C. for 4 hours and stripping of volatile matters at 150° C. under a pressure of 5 Torr. Thereafter, the reaction mixture was washed with toluene by the addition of 200 g of toluene followed by vigorous agitation and standing to be separated into layers, of which the upper layer was taken and discarded. After repeating this procedure of washing with toluene, the reaction mixture was freed from volatile matters by stripping at 150° C. under a pressure of 5 Torr to give 1060 g of a fluorine-containing organopolysiloxane having a viscosity of 48,000 centistokes at 25° C. and expressed by the formula, in which Me is a methyl group and $R_f^1$ is a 3,3,3-trifluoropropyl group,

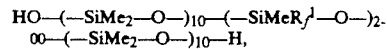

which is referred to as the F-siloxane B hereinbelow.

PREPARATION 2

The same procedure as in the preparation of the F-siloxane A was repeated excepting replacement of 5 g of the acetic acid added after completion of the ring-opening polymerization with a combination of 100 g of 1,3-divinyl-1,1,3,3-tetramethyl disilazane and 27 g of vinyl dimethyl chlorosilane to give 940 g of a fluorine-containing organopolysiloxane having a viscosity of 43,000 centistokes at 25° C. and expressed by the formula

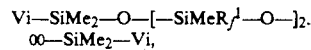

in which Vi is a vinyl group and $R_f^1$ is a 3,3,3-trifluoropropyl group, referred to as the F-siloxane A-1 hereinbelow.

Into a reaction vessel equipped with a reflux condenser were introduced 1000 g of the F-siloxane A-1 prepared above and 1 g of a 1% propanol solution of chloroplatinic acid under agitation and the mixture was heated up to a temperature of 100° C. followed by dropwise addition of 15 g of dimethyl chlorosilane to effect the hydrosilation reaction. After heating at 100° C. for 5 hours to complete the reaction, the reaction mixture was added dropwise into a dispersion of sodium hydrogen carbonate in toluene and the mixture was thoroughly agitated for 6 hours at room temperature followed by filtration. The filtrate was freed from toluene by stripping at 25° C. under a pressure of 5 Torr and then freed from other volatile matters by stripping at 150° C. under a pressure of 5 Torr for 5 hours to give 870 g of a clear liquid product having a viscosity of 48,000 centistokes at 25° C. expressed by the structural formula

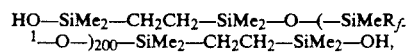

which is referred to as the F-siloxane C hereinbelow.

PREPARATION 3

A siloxane oligomer mixture was prepared from 1,3,3,5,5-pentamethyl-1-($R_f^3$-substituted) cyclotrisiloxane, hexamethyl cyclotrisiloxane and 1,1,3,3-tetramethyl-1,3-divinyl disiloxane, in which $R_f^3$ is a group expressed by the formula —$(CH_2)_3OCH_2CF(CF_3)O(CF_2)_2CF_3$, in a molar ratio of 120:240:1. A 100 parts portion of the mixture was admixed with 0.2 part of trifluoromethane sulfonic acid and agitated at room temperature for 10 hours to effect the siloxane equilibration reaction followed by the addition of 1 part of a 28% ammonia water and agitation for 1 hour at room temperature to neutralize the acid catalyst. The reaction mixture was filtrated to remove the precipitates and the filtrate was freed from volatile matters by stripping at 150° C. under a pressure of 5 Torr for 5 hours to give 475 g of a clear liquid product having a viscosity of 38,000 centistokes at 25° C. expressed by the structural formula

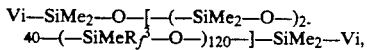

Vi—SiMe$_2$—O—[—(—SiMe$_2$—O—)$_2$._$_{40}$—(—SiMeR$_f^3$—O—)$_{120}$—]—SiMe$_2$—Vi, which is referred to as the F-siloxane A-2 hereinbelow.

The above prepared F-siloxane A-2 was reacted with dimethyl chlorosilane in the same manner as in the reaction of the F-siloxane A-1 with dimethyl chlorosilane in Preparation 2 followed by the hydrolysis reaction to give 380 g of a clear liquid product having a viscosity of 42,000 centistokes at 25° C. expressed by the structural formula

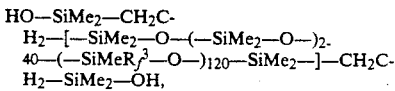

HO—SiMe$_2$—CH$_2$CH$_2$—[—SiMe$_2$—O—(—SiMe$_2$—O—)$_2$._$_{40}$—(—SiMeR$_f^3$—O—)$_{120}$—SiMe$_2$—]—CH$_2$CH$_2$—SiMe$_2$—OH, which is referred to as the F-siloxane D hereinbelow.

PREPARATION 4

The procedure was substantially the same as in the Preparation 3 described above execepting replacement of the fluorine-containing group R$_f^2$ with 2-(perfluorobutyl)ethyl group, denoted by R$_f^3$ hereinbelow, to give 480 g of a clear liquid product having a viscosity of 47,000 centistokes at 25° C. expressed by the structural formula

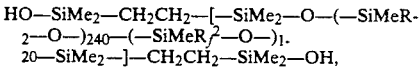

HO—SiMe$_2$—CH$_2$CH$_2$—[—SiMe$_2$—O—(—SiMeR$_f^2$—O—)$_{240}$—(—SiMeR$_f^3$—O—)$_{120}$—SiMe$_2$—]—CH$_2$CH$_2$—SiMe$_2$—OH, which is referred to as the F-siloxane E hereinbelow.

EXAMPLES AND COMPARATIVE EXAMPLE

Each a 100 g portion of the above prepared F-siloxanes A, B, C, D and E was admixed with 1 g of tetraethoxy silane and 0.1 g of dibutyl tin dilaurate to prepare compositions A to E, respectively, and 3 g of the mixture were taken in an aluminum-made petri dish of 6 cm diameter and kept for 24 hours in an air-conditioned room at 25° C. with a relative humidity of 40%. The degree of curing of the mixture in the dish was examined to find that almost no curing took place in the composition A while the compositions B, C, D and E were cured each into a rubbery form although the hardness of the rubber was somewhat lower in the compositions D and E than the other two.

Separately, each of the compositions A to E prepared above was admixed with 0.5 g of water containing a small amount of a surface active agent and 5 g of a hydrophobic fumed silica filler having a specific surface area of 90 m$^2$/g (Aerosil R-872, a product by Nippon Aerosil Co.) and subjected to the same curing test as above to find that a gel-like mass was formed from the composition A and the hardness of the rubbers formed from the compositions B to E was higher than without addition of the filler.

What is claimed is:

1. A curable fluorosilicone rubber composition which is a uniform blend comprising:
   (a) 100 parts by weight of a fluorine-substituted organopolysiloxane represented by the general formula

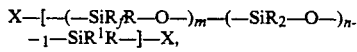

X—[—(—SiR$_f$R—O—)$_m$—(—SiR$_2$—O—)$_n$._$_{-1}$—SiR$^1$R—]—X, in which R is a monovalent hydrocarbon group having 1 to 8 carbon atoms, R$_f$ is a fluorine-substituted alkyl group or a fluorine-substituted alkyl group having one or more of etheric oxygen atoms —O— or amide linkages —CONH— between carbon atoms, R$^1$ is R or R$_f$, X is a group represented by the general formula

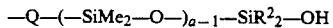

—Q—(—SiMe$_2$—O—)$_{a-1}$—SiR$^2_2$—OH

Me being a methyl group, Q being a divalent group of the formula —O—Si(CH$_3$)$_2$—O— or a divalent hydrocarbon group having 2 to 10 carbon atoms, R$^2$ being an atom or group selected from the class consisting of a hydrogen atom, a hydroxy group, a methyl group and a vinyl group and the subscript a being an integer of 1 to 20, and the subscripts m and n are each a positive integer with the proviso that m+n is in the range from 10 to 3000;
   (b) from 0.5 to 20 parts by weight of an organosilicon compound having, in a molecule, at least three hydrolyzable groups bonded to the silicon atom or atoms;
   (c) up to 500 parts by weight of an inorganic filler; and
   (d) a curing catalyst in an amount sufficient to cure the composition into an elastomeric form.

2. The curable fluorosilicone rubber composition as claimed in claim 1, wherein the subscript a is a positive integer of 2 to 20.

3. The curable fluorosilicone rubber composition as claimed in claim 1, wherein the group denoted by R$_f$ is a 3,3,3-trifluoropropyl group or a 2-(perfluorobutyl)ethyl group.

4. The curable fluorosilicone rubber composition as claimed in claim 1, wherein the group denoted by R is a methyl group.

5. The curable fluorosilicone rubber composition as claimed in claim 1, wherein the group denoted by R$^1$ is R.

* * * * *